April 20, 1965 D. G. W. INGRAM 3,179,754

ELECTRIC COMMUNICATION SYSTEMS

Filed Oct. 3, 1961 2 Sheets-Sheet 1

INVENTOR
DEREK GEORGE WOODWARD INGRAM
BY Kinzler, Kinzler & Ottinger
ATTORNEYS

INVENTOR
Derek George Woodward Ingram
BY [signature]
ATTORNEYS

3,179,754
ELECTRIC COMMUNICATION SYSTEMS

Derek George Woodward Ingram, Harrow, Middlesex, England, assignor to The General Electric Company Limited, London, England Filed Oct. 3, 1961, Ser. No. 142,674
Claims priority, application Great Britain, Oct. 4, 1960, 33,992/60
6 Claims. (Cl. 179—175.31)

This invention relates to electric communication systems.

More particularly, the invention is concerned with electric communication systems of the kind (hereinafter referred to as "communication systems of the kind specified") in which at least one repeater is provided between the terminal stations of the system, while the transmission path on either side of the repeater comprises two separate conducting paths, these paths, in addition to being used for the transmission of signals between the terminal stations, being arranged to be supplied with an electric current which forms the power supply current for the repeater. In a two-wire system one wire forms one of the conducitng paths and the other wire forms the other conducting path, while in a four-wire system one pair of the wires forms one of the conducting paths and the other pair of wires forms the other conducting path.

In previously known communication systems which are of the kind specified and which have a plurality of repeaters, it has usually been necessary to isolate the sections of the transmission path between adjacent pairs of repeaters when locating a fault. This is clearly a tedious procedure if there are a large number of repeaters, and it is therefore, an object of the present invention to provide a communication system of the kind specified which, at least in some cases, enables a simpler procedure to be used in locating a fault.

According to the present invention, in a communication system of the kind specified said repeater has associated with it a path which by-passes the repeater and a path which is connected across the conductors over which the power supply current is arranged to be supplied, said paths offering a high resistance to the passage of said current when the system is operating normally, but being arranged to offer a lower resistance in fault conditions.

According to a feature of the present invention, repeater station apparatus for a communication system of the kind specified comprises a repeater which has associated with it a path which by-passes the repeater and a path which is arranged to be connected across the conductors over which the power supply current is arranged to be supplied, said paths offering a high resistance to the passage of said current when the system is operating normally but being arranged to offer a lower resistance in fault conditions.

A communication system in accordance with the present invention, together with a modification of the system, will now be described by way of example with reference to the accompanying drawings in which.

Figure 1:
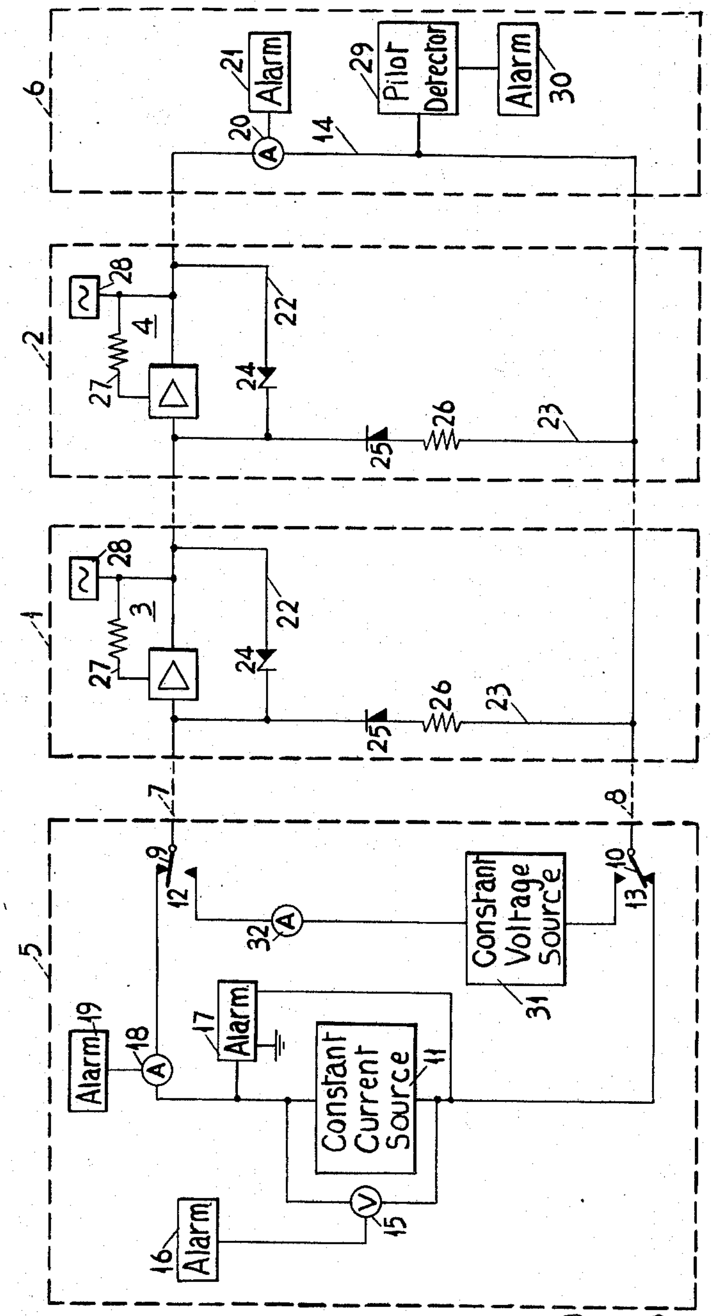
FIGURE 1 shows the system in simplified and largely schematic form.

Referring now to FIGURE 1 of the drawings, this shows, in simplified and largely schematic form, a part of the communication system to be described, this figure being used to explain the operation of the invention. The communication system is a multi-channel carrier telephony system having a plurality of repeater stations, such as the repeater stations 1 and 2, which include like repeaters 3 and 4 respectively, connected between two terminal stations 5 and 6. Adjacent stations of the system are connected by coaxial pairs in order to provide the required carrier frequency circuit between the terminal stations 5 and 6. In FIGURE 1 a single coaxial pair made up of conductors 7 and 8 is shown, the repeaters 3 and 4 being connected in the conductor 7.

At the terminal station 5 the conductors 7 and 8 are provided with terminals 9 and 10, respectively, across which is arranged to be connected a constant current source 11 which supplies a direct current of substantially constant value to the conductors 7 and 8, this current forming the power supply current for the operation of the repeaters 3 and 4. The source 11 is connected to the terminals 9 and 10 by way of contacts 12 and 13, which are normally in the positions shown in FIGURE 1. At the terminal station 6 the conductors 7 and 8 are connected together by a loop 14, so that a continuous path for direct current from the source 11 is provided between the terminals 9 and 10.

Connected across the source 11 is a voltmeter 15 having associated with it an alarm 16. The voltmeter 15 gives an indication of the voltage at the terminals of the source 11, and the alarm 16 is arranged to give an indication if this voltage falls to an abnormally low value. Also associated with the source 11 is an earth current alarm 17 which is arranged to give an indication if current from the source 11 is being lost to earth. Connected between the source 11 and the terminal 9 is an ammeter 18 having associated with it an alarm 19. The ammeter 18 is arranged to give an indication of the value of the current being supplied by the source 11 to the conductors 7 and 8, whilst the alarm 19 is arranged to give an indication if this current falls to an abnormally low value.

As an additional safeguard the terminal station 6 is provided with an ammeter 20 and associated alarm 21, the ammeter 20 and alarm 21 operating in the same way as the ammeter 18 and the alarm 19 at the terminal station 5. The source 11 could, in fact, be provided at the terminal station 6 if desired.

The repeater 3 has in association with it a path 22 connected between its input and output, and a path 23 which connects the input of the repeater 3 to the conductor 8. The path 22 comprises a Zener diode 24, whilst the path 23 comprises a rectifier element 25 and a resistor 26. Similar paths 22 and 23 are provided for each of the other repeaters 4, etc., of the system.

If it is assumed that during operation the terminal 9 is maintained at a positive potential relative to the terminal 10, then the Zener diodes 24 and the rectifier elements 25 are arranged to have their cathode terminals nearer the terminal 9. If then the system is operating normally, the repeater 3 will have a comparatively low resistance, so that there will be a comparatively small voltage drop across the associated Zener diode 24 which will, therefore, be non-conducting. Similarly, the associated rectifier element 25 will be biased so as to be non-conducting.

The system is provided with an arrangement of supervisory pilot signals as described in British patent specification No. 853,884. Briefly, this means that each of the repeaters 3, 4, etc., has a negative feed-back path 27 into which is arranged to be injected a signal characteristic of the repeater by an associated oscillator 28. The terminal station 6 then includes an array of pilot detectors 29 which are arranged to detect the presence of the pilot signals characteristic of the various repeaters 3, 4, etc. In the event of failure of one of the repeaters 3, 4, etc., the associated pilot signal will also fail, and this is arranged to cause an alarm to be given by an alarm 30 which is associated with the pilot detectors 29.

Referring once more to the terminal station 5, this also includes a constant voltage source 31, the terminals of which are connected directly and by way of an ammeter 32, respectively, to the alternative contacts 12 and 13. By reversing the position of the contacts 12 and 13 it is therefore possible to arrange that the source 31 is connected to the terminals 9 and 10 in place of the source 11. The polarity of the source 31 is opposite to that of the source 11.

Although for simplicity not shown in FIGURE 1, the repeater stations 1 and 2 include power separation filters to separate the power supply current from the carrier frequency signals.

The majority of faults which are likely to occur in the system can be attributed to one or more of three main causes, these being as follows.

(1) An open circuit.

This may occur in a repeater or in the transmission path between two stations. (Open circuits are taken to include faults in which a high resistance, the effect of which is similar to an open circuit, develops.)

(2) A short circuit.

This may occur in a repeater or in the transmission path between two stations. (Short circuits are taken to include faults in which a low resistance, the effect of which is similar to a short circuit occurs.)

(3) An earth.

That is to say, a fault in which power supply current is lost to earth.

The effect of these faults on the system will be considered in turn.

If an open circuit develops in a repeater, the repeater 3 say, between its input and output, then the voltage drop across the associated Zener diode 24 will increase, and it is arranged that this increase is sufficient to cause the Zener diode 24 to break down so as to conduct in its reverse direction. The power supply current to the remaining repeaters 4, etc., is therefore maintained, but the fact that repeater 3 has ceased to operate will be indicated by the alarm 30 associated with the pilot detectors 29 in the terminal station 6.

(Here it should be said that, in fact, the Zener diodes 24 may be selected to have a reverse breakdown voltage of such a value that the Zener diodes 24 are just conducting in their reverse direction during normal operation. The advantage of this is that the power supply current is then supplied to repeaters 3, 4, etc., at a constant voltage. However, if an open circuit develops in a repeater, the repeater 3 say, between its input and output, then the voltage drop across the associated Zener diode 24 will increase and the Zener diode 24 will conduct considerably more heavily, as its direct current resistance will then be lower.)

If an open circuit develops in one of the conductors 7 or 8, between the repeaters 3 or 4, this will be indicated by the alarm 30 associated with the pilot detectors 29, by the alarms 19 and 21 associated with the ammeters 18 and 20, and by a high output voltage reading by the voltmeter 15 connected across the source 11.

To determine where the open circuit has occurred, the contacts 12 and 13 are reversed so that the source 11 is disconnected from the terminals 9 and 10 and replaced by the constant voltage source 31. As the source 31 is of reverse polarity, each of the rectifier elements 25 up to the point where the open circuit has occurred will be biased in the conducting direction, as will the Zener diodes 24. Each of the paths 23 up to the open circuit will therefore pass a current and a measurement of the total current supplied to the conductors 3 and 4, as indicated by the ammeter 32, together with a knowledge of the resistance of the conductors 7 and 8, the resistance between the input and output of each repeater 3, 4, etc., and the value of the resistors 26, will enable the location of the open circuit to be determined.

If desired the constant voltage source 31 may be provided at the terminal station 6, in which case the loop 14 is broken and an additional loop is provided at the terminal station 5 to enable the terminals 9 and 10 to be connected together. If this is done the Zener diodes 24 up to the point where the open circuit has occurred must be biased so as to be conducting in the reverse direction, and in calculating the location of the open circuit a value for the resistance between the input and output of each repeater 3, 4, etc., different from that used in the previous case, must be used to take account of this.

If a short circuit develops in a repeater, the repeater 3 say, between its input and output, then the voltage drop across the repeater 3 will fall and this will be indicated by a fall in the output voltage reading of the voltmeter 15 connected across the source 11. The fact that it is the repeater 3 which has the short circuit will be indicated by the alarm 30 associated with the pilot detectors 29.

If a short circuit develops on a transmission path between repeaters 3, 4, etc., this will be indicated by the alarm 30 associated with the pilot detectors 29, and by a low output voltage reading at the voltmeter 15 connected across the source 11. The amount of this fall in the voltage, together with the knowledge of the resistance of the conductors 7 and 8, and of the repeaters 3, 4, etc., enables an estimate of the location of the fault to be made.

If an earth fault develops, either in a repeater or in a transmission path between stations, this will be indicated by the earth current alarm 17, and by the alarm 30 associated with the pilot detectors 29. A measurement of the voltage to earth at the source 11 and a knowledge of the resistance of the conductors 7 and 8 and of the repeaters 3, 4, etc., will enable an estimate of the location of the fault to be made.

From the foregoing description it will be appreciated that a communication system incorporating the present invention is such as to permit open circuit faults, which would otherwise be difficult to locate, to be readily located.

Figure 2:
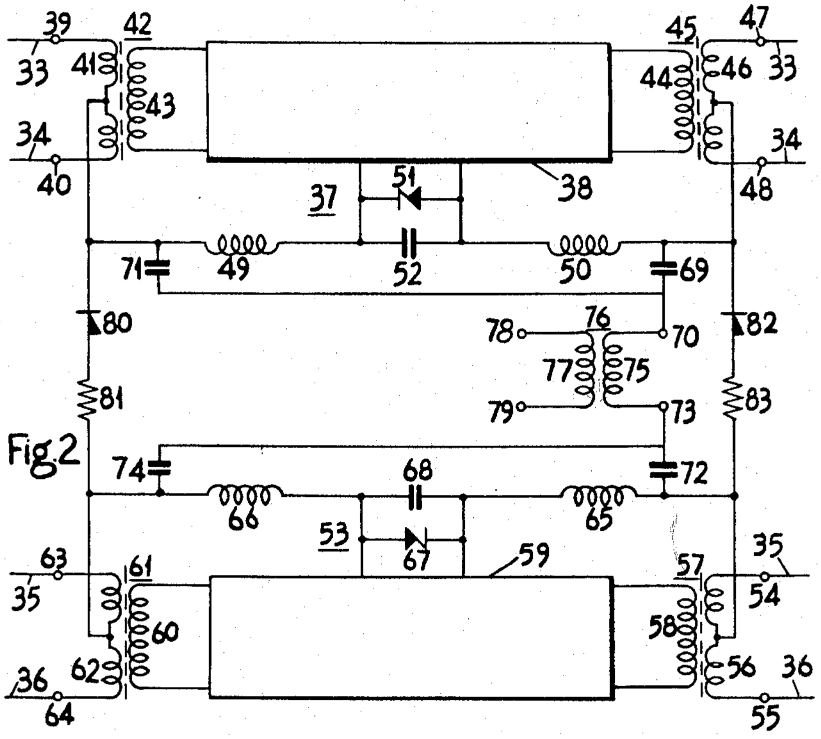
FIGURE 2 shows a part of the system of FIGURE 1 in more detail.

The way in which the paths 22 and 23 are provided will now be described in more detail with reference to FIGURE 2 of the drawings. The system, in fact, uses four conductors 33, 34, 35 and 36 which are connected between the terminal stations 5 and 6 (not shown in this figure), these conductors forming pairs 33 and 34, and 35 and 36. The pair of conductors 33 and 34 is used for carrier frequency signals transmitted in one direction, whilst the pair of conductors 35 and 36 is used for the transmission of carrier frequency signals in the other direction. In addition, the pairs of conductors 33 and 34, and 35 and 36 together provide a phantom circuit over which audio frequency signals may be transmitted.

Connected in the pair of conductors 33 and 34 is a repeater 37 which comprises a carrier frequency amplifier 38, which includes the negative feedback path and oscillator referred to in connection with the supervisory pilot signals, together possibly with an equaliser or line regulator. The repeater 37 has input terminals 39 and 40 which are connected to the conductors 33 and 34 respectively, at the incoming end of the repeater 37. The terminals 39 and 40 are connected to the two terminals respectively of a centre tapped primary winding 41 of a transformer 42, a secondary winding 43 of which is connected to the amplifier 38. The output from the amplifier 38 is connected across the primary winding 44 of a transformer 45, the centre tapped secondary winding 46 of which is connected to terminals 47 and 48 which are connected to the conductors 33 and 34 respectively, at the output end of the repeater 37.

The centre tapping of the winding 41 is connected by way of an inductor 49 to the part of the amplifier 38 where the power supply current is required, and thence by way of an inductor 50 to the centre tapping of the winding 46. Connected between the inductors 49 and 50 in parallel relationship to the amplifier 38 is a Zener diode 51 and a capacitor 52.

Connected in the pair of conductors 35 and 36 is a repeater 53 similar to the repeater 37. The repeater 53 has input terminals 54 and 55 which are connected to the conductors 35 and 36 respectively, at the incoming end of the repeater 53. The terminals 54 and 55 are connected to the two terminals respectively of a centre tapped primary winding 56 of a transformer 57, the secondary winding 58 of which is connected to an amplifier 59. The output from the amplifier 59 is connected across the primary winding 60 of a transformer 61, the centre tapped secondary winding 62 of which is connected to terminals 63 and 64 which are connected to the conductors 35 and 36 respectively, at the output end of the repeater 53.

The centre tapping on the winding 56 is connected by way of an inductor 65 to the part of the amplifier 59 where the power supply is required, and thence by way of an inductor 66 to the centre tapping on the winding 62. Connected between the inductors 65 and 66 in parallel relationship to the amplifier 59 is a Zener diode 67 and a capacitor 68.

The phantom circuit is provided by a connection from the centre tapping of the winding 46 by way of a capacitor 69 to a terminal 70, the centre tapping of the winding 41 also being connected to the terminal 70 by way of a capacitor 71, and a connection from the centre tapping of the winding 56 by way of a capacitor 72 to a terminal 73, the centre tapping of the winding 62 also being connected to the terminal 73 by way of a capacitor 74. The terminals 70 and 73 are connected to the two terminals respectively of the primary winding 75 of a transformer 76, a secondary winding 77 of which is connected to terminals 78 and 79. When the phantom circuit is to be used connection is made across the terminals 78 and 79.

The centre tapping of the winding 41 is connected to the centre tapping of the winding 62 by way of a rectifier element 80 and a resistor 81 in series, while the centre tapping of the winding 46 is connected to the centre tapping of the winding 56 by way of a rectifier element 82 and a resistor 83 in series.

During operation of the system, power supply current is fed over the conductors 33 and 34 in parallel and over the conductors 35 and 36 in parallel. Power supply current therefore passes from the terminals 39 and 40 to the centre tapping of the winding 41 (not having any effect on the carrier frequency signals, which are supplied to the winding 43) and then by way of inductor 49 to the amplifier 38. From the amplifier 38 the power supply current passes by way of inductor 50 to the centre tapping of the winding 46 and thence to the terminals 47 and 48. In the return path the power supply current passes through the repeater 53 in a similar manner.

It will be appreciated, therefore, that the Zener diodes 51 and 67 correspond to the Zener diodes 24 in the paths 22 of FIGURE 1 and that the rectifier elements 80 and 82 and the resistors 81 and 83 correspond to the rectifier elements 25 and the resistors 26, respectively, in the paths 23 of FIGURE 1. The indications given on the occurrence of a fault and the method of locating a fault are then similar to those described with reference to FIGURE 1.

It is not, in fact, essential to provide the rectifier element 80 and its associated resistor 81 in addition to the rectifier element 82 and its associated resistor 83, although it does sometimes enable an open circuit or a short circuit to be more accurately located.

Figure 3:
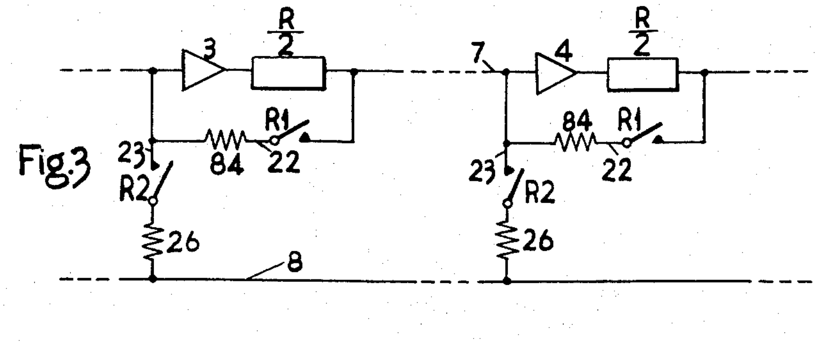
FIGURE 3 shows in simplified form a part of the system of FIGURE 1, but incorporating the modification.

The Zener diodes 24 (or 51 and 67) and the rectifier elements 25 (or 80 and 82) in FIGURE 1 (or 2) may be replaced by electrically-controlled mechanical switches; such an arrangement being shown in simplified form in FIGURE 3 of the drawings, to which reference is now made. FIGURE 3 is similar to FIGURE 1 but shows merely the repeater stations 1 and 2 and not the terminal stations 5 and 6, the terminal stations 5 and 6 shown in FIGURE 1 not being modified in this arrangement. Where possible the same reference numerals are used in FIGURE 3 as in FIGURE 1.

In the modified arrangement the operating winding of an electromagnetic relay R/2 is connected in series with the repeater 3, the relay R/2 having a contact R1 in series with a resistor 84 in the path 22, and a contact R2 in series with a resistor 26 in the path 23.

In normal operation of the system the power supply current flows in the operating winding of the relay R/2, and it is arranged that this current causes the relay R/2 to be operated so that the contacts R1 and R2 are open as shown.

If now an open circuit occurs in a repeater, the repeater 3 say, the power supply current ceases to flow in the operating winding of the relay R/2, so that the contacts R1 and R2 close. The power supply current to the remaining repeaters 4, etc., is therefore maintained and the repeater 3 which has the open circuit may be located by the supervisory pilot signals.

If an open circuit develops in one of the conductors 7 or 8, between the repeaters 3 and 4 say, the contacts R1 and R2 at each repeater 3, 4, etc., will close and a measurement of the total current supplied to the conductors 7 and 8 as indicated by the ammeter 18 or 20 (FIGURE 1), will enable the location of the open circuit to be determined.

In the modified system, it is necessary that the value of current which operates relays R/2 should be sufficiently high to prevent the operation of the relays R/2 by the current flowing in the paths 23 when an open circuit has occurred in one of the conductors 7 or 8 and the contacts R1 and R2 have closed. Also, the value of the resistors 84 must be sufficiently high to ensure that when an open circuit on the conductor 7 or 8 has been repaired, sufficient voltage is developed across the resistor 84 to allow the relay R/2 to be operated, thus causing the contacts R1 and R2 to open and normal operation to be restored. This means that for a normal value of power supply current the voltage drop across each resistor 84 should be of the same order as the normal voltage drop across repeaters 3, 4, etc.

Apart from this, the operation of the modified system shown in FIGURE 3 is similar to that described in FIGURE 1.

The system may, of course, be further modified, for example by substituting the Zener diode, such as the Zener diode 24, for the resistor 84 and contact R1 in the paths 22, the relay R/2 then operating only the contact R2 in the paths 23.

I claim:

1. A communication system including two terminal stations and a plurality of repeaters interconnected between the terminal stations, a transmission path which connects the terminal stations by way of the repeaters for the transmission of signals between the terminal stations and which comprises two separate conducting paths, a first source of electric current, first switching means at one of the terminal stations to connect the first source between the two conducting paths of the transmission path, means to connect the repeaters in one of the two conducting paths so that the repeaters are connected in series with regard to power supply current fed thereto by the first source, a plurality of first variable resistance paths one associated with each repeater and each of these paths bypassing the associated repeater, a plurality of second variable resistance paths one associated with each repeater and each of these paths being connected between the two conducting paths at the associated repeater, a plurality of means associated one with each repeater and each of these means responding to a drop in the supply current fed to the associated repeater to reduce the resistance of the first path associated with that repeater so as to maintain the flow of supply current to the other repeaters, a second source of electric current, second switching means at one of the terminal stations to connect said second source between the two conducting paths of the transmission path so that the current supplied thereby is of the opposite polarity relative to the polarity of the current arranged to be supplied by the first source by way of the first switching means, and a plurality of means associated one with each repeater and each of these means responding to the polarity of current supplied to the conducting paths by the second source by way of the second switching means to reduce the resistance of the second path associated with that repeater.

2. A communication system in accordance with claim 1 including an arrangement of supervisory pilot signals, one associated with each repeater, the pilot signal for each repeater being transmitted to at least one of the terminal stations when the repeater is operating normally, a plurality of alarms one for each pilot signal, the alarms being situated at said one of the terminal stations and each alarm being arranged to be operated if the relevant pilot signal dissappears so that in the event of the failure of a repeater an indication is given by the alarms as to which repeater has failed.

3. A communication system including two terminal stations and a plurality of repeaters interconnected between the terminal stations, a transmission path which connects the terminal stations by way of the repeaters for the transmission of signals between the terminal stations and which comprises two separate conducting paths, a constant current source of electric current, first switching means at one of the terminal stations to connect the constant current source between the two conducting paths of the transmission path, means to connect the repeaters in one of the two conducting paths so that the repeaters are connected in series with regard to power supply current fed thereto by the constant current source, a plurality of first paths which each comprises a Zener diode and which are associated one with each repeater to bypass the associated repeater, the Zener diodes being so poled relative to the power supply current that during normal operation they are reverse biased and upon an open circuit occurring in one of the repeaters the voltage across the associated Zener diode then causes that diode to break down and thereby maintain the flow of supply current to the other repeaters, a plurality of second paths which each comprises a rectifier element and which are associated one with each repeater and connected between the two conducting paths at the associated repeater, the rectifier elements being so poled that during normal operation they are biased to be nonconducting, a constant voltage source of electric current, and second switching means at one of the terminal stations to connect said constant voltage source between the two conducting paths of the transmission path so that the current supplied thereby is of the opposite polarity relative to the polarity of the current arranged to be supplied by the constant current source by way of the first switching means, the first and second switching means being operable to connect the constant voltage source to the transmission path in place of the constant current source when a fault is to be located and the constant voltage source being of the polarity to forward bias the Zener diodes and to bias the rectifier elements to be conducting.

4. A communication system according to claim 3 wherein the reverse breakdown voltage of each of said Zener diodes is selected such that during normal operation the Zener diode is operating in the region of its reverse breakdown point so that the supply current fed to the associated repeater from the constant current source is at a substantially constant voltage.

5. A communication system including two terminal stations and a plurality of repeaters interconnected between the terminal stations, a transmission path which connects the terminal stations by way of the repeaters for the transmission of signals between the terminal stations and which comprises two separate conducting paths, a source of electric current, means at one of the terminal stations to connect the source between the two conducting paths of the transmission path, means to connect the repeaters in one of the two conducting paths so that the repeaters are connected in series with regard to power supply current fed thereto by the source, a plurality of variable resistance paths one associated with each repeater and each of these paths bypassing the associated repeater, and a plurality of means which are associated one with each repeater and each of which responds to a drop in the supply current fed to the associated repeater to reduce the resistance of the variable resistance path associated with that repeater so as to maintain the flow of supply current to the other repeaters.

6. A communication system in accordance with claim 5 including a plurality of electromagnetic relays one associated with each repeater, each relay having an operating winding which is connected in one of said conducting paths in series with the associated repeater and each relay having first and second pairs of contacts, said first pair of contacts being in the variable resistance path associated with that repeater and said second pair of contacts being connected in series with resistances in a path connected between the two conducting paths at the associated repeater, said first and second pairs of contacts normally being open but being arranged to be closed when the operating winding of the relay is deenergized.

References Cited by the Examiner

UNITED STATES PATENTS 2,321,723 6/43 Zinn ------------------ 179—1

ROBERT H. ROSE, *Primary Examiner.*

WALTER L. LYNDE, *Examiner.*